March 13, 1951  C. J. KEIM ET AL  2,544,997
ACTUATING SYSTEM FOR AIR-BRAKE MECHANISMS
Filed Jan. 25, 1949  3 Sheets-Sheet 1
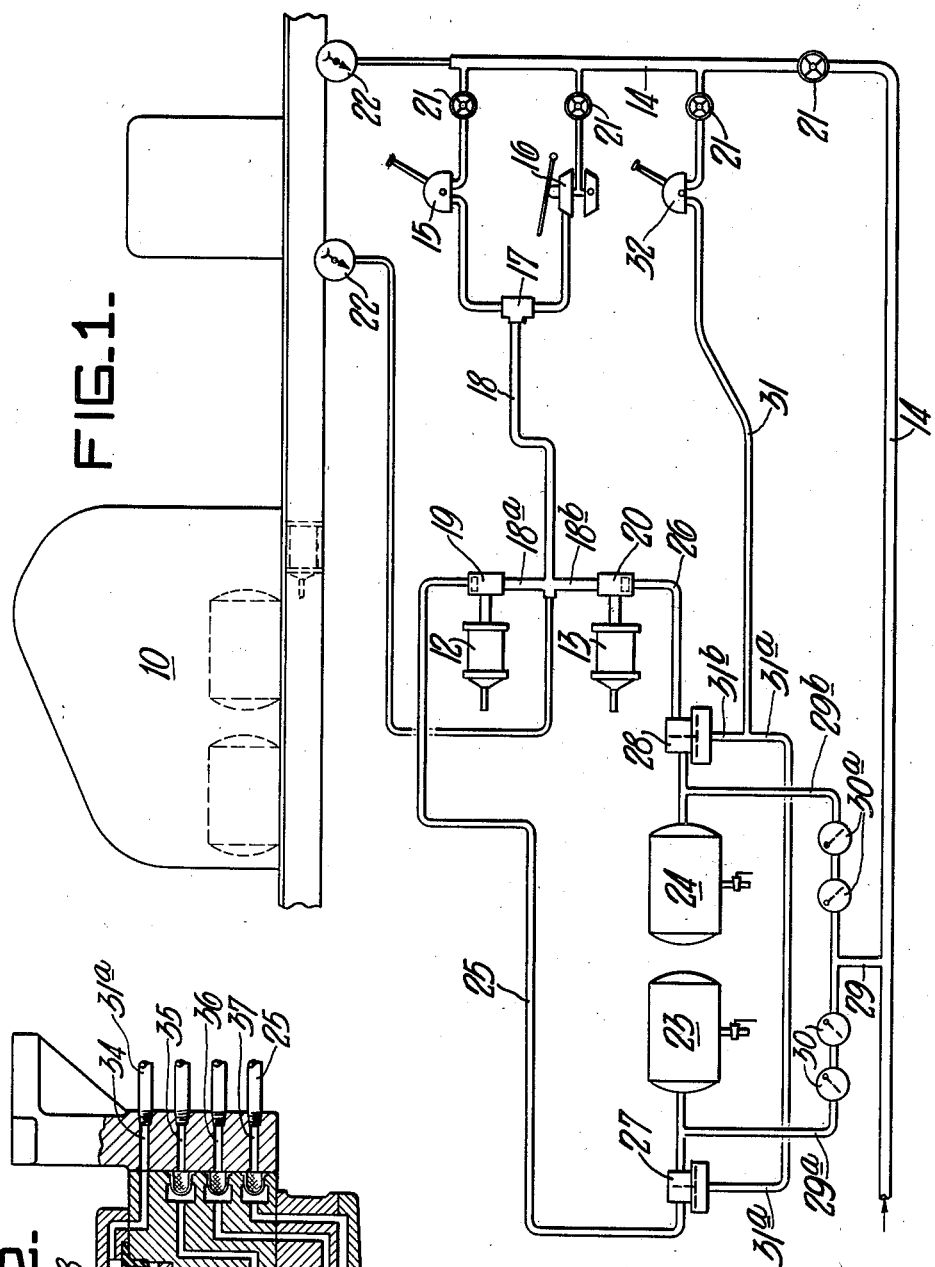
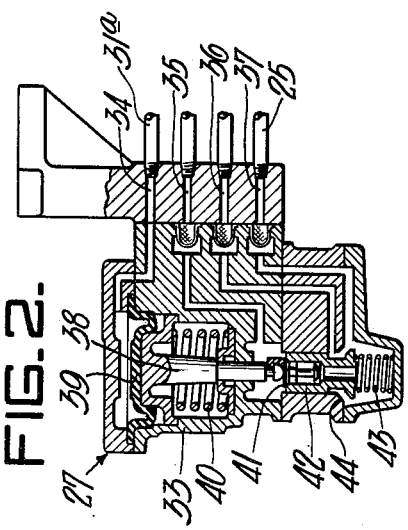
Inventors:
CHARLES J. KEIM, AUGUST R.
MAIER and ALEXANDER QUAYLE,
by: Donald G. Dalton
their Attorney.

March 13, 1951

C. J. KEIM ET AL 2,544,997

ACTUATING SYSTEM FOR AIR-BRAKE MECHANISMS

Filed Jan. 25, 1949

Inventors:
CHARLES J. KEIM, AUGUST R. MAIER
and ALEXANDER QUAYLE,
by: Donald G. Dalton
Their Attorney.

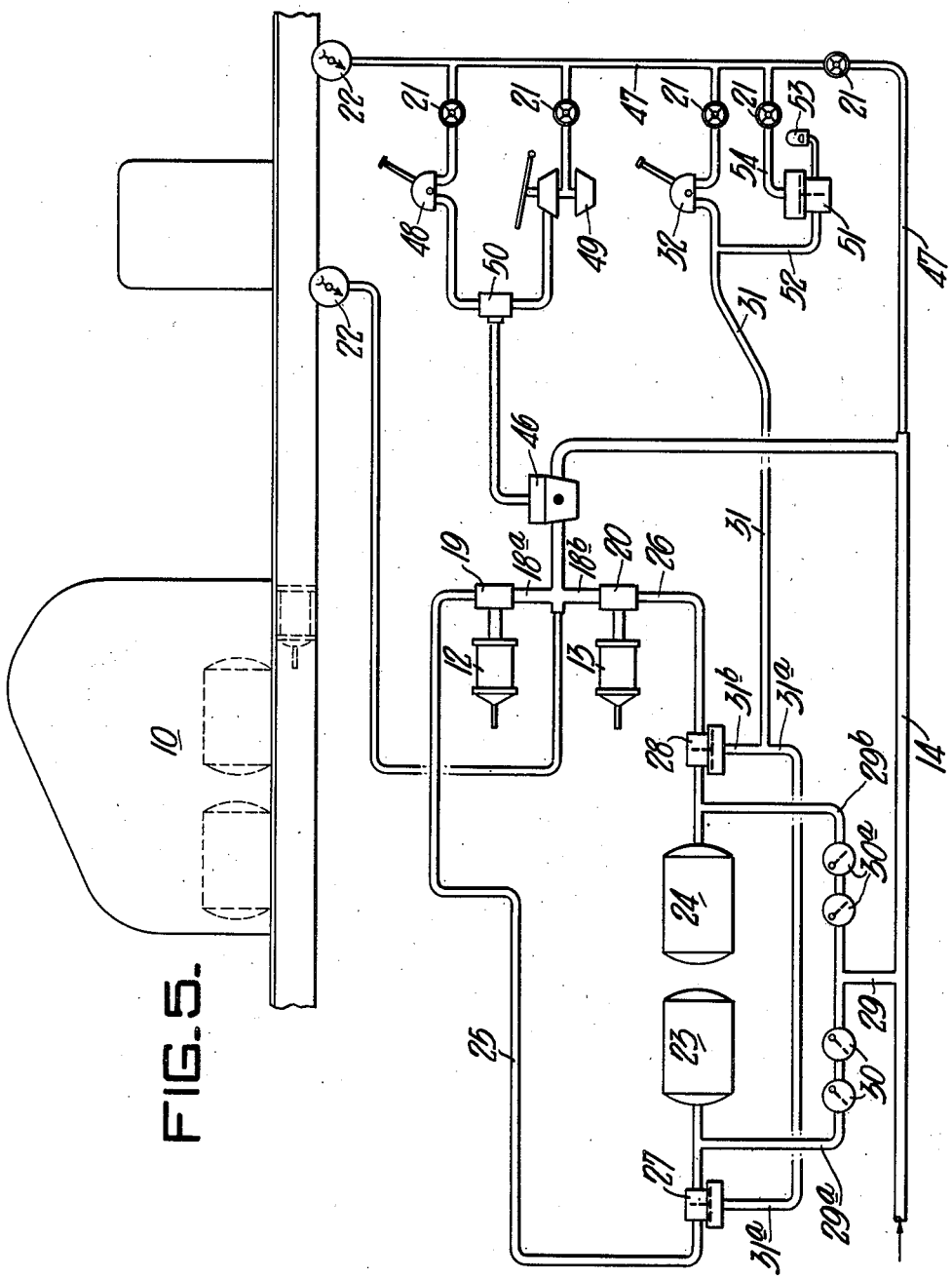

Patented Mar. 13, 1951

2,544,997

UNITED STATES PATENT OFFICE 2,544,997

ACTUATING SYSTEM FOR AIR-BRAKE MECHANISM

Charles J. Keim, Oil City, Pa., August R. Maier, Dallas, Tex., and Alexander Quayle, Oil City, Pa., assignors to Oil Well Supply Company, a corporation of New Jersey Application January 25, 1949, Serial No. 72,672

6 Claims. (Cl. 188—151)

1

This invention relates to actuating systems for air brake mechanisms, particularly those suitable for hoist reels in well drilling drawworks.

Hoist reels commonly are equipped with two braking devices, each of which includes a brake drum and a cooperating brake shoe or band. In those which are air operated, the actuating system includes one or more air cylinders, which are actuated from a single source, and usually emergency means which apply the brakes automatically when the air supply fails. However, in previous systems with which we are familiar, when failure is in a cylinder, the emergency means does not apply the brakes, but instead the emergency air supply is lost.

An object of the present invention is to provide improved systems for normal and emergency actuation of air brake mechanisms in which the two braking devices normally are actuated from a single source, but in which the emergency actuating means for the two devices are separate and the emergency means for either still operates when the other fails.

A further object of the invention is to provide improved systems for normal and emergency actuation of air brake mechanisms in which each braking device has its own cylinder and emergency air supply separate from the other and in the event of failure each emergency air supply operates its own brake cylinder and is sealed from the other cylinder.

A further object of the invention is to provide improved air brake actuating systems which have the foregoing features and in which an audible warning foretells brake failure.

A further object of the invention is to provide improved air brake actuating systems which have the foregoing features and are of the air-applied, spring-released type, thus furnishing more sensitive braking action.

In accomplishing these and other objects of the invention, we have provided improved details of structure, preferred forms of which are shown in the accompanying drawings, in which:

Figure 1 is a schematic representation of one form of air brake actuating system embodying features of the present invention;

Figures 2 and 3 are detailed sectional views of a preferred construction of relay air valve used in the system and showing the valve in two different positions;

Figure 4 is a schematic representation of a modified form of actuating system embodying features of the present invention; and Figure 5 is a schematic representation of a

2 further modified form of system embodying features of the present invention.

In Figure 1 there is shown schematically a drawworks 10, which has two brake cylinders 12 and 13, each of which actuates one of the two braking devices. Preferably these cylinders are of the air-applied, spring-released type. Normally the two cylinders are actuated from a single source and apply both braking devices simultaneously. The cylinders, the braking devices and the connecting mechanism may be of any standard construction, and hence are not shown nor described in detail.

The actuating system for the cylinders comprises a main supply line 14, which is connected to a main source of compressed air, and preferably two control valves 15 and 16 which are arranged in parallel, and control normal actuation of the cylinders. Preferably there are two of these control valves, one of which is hand operated and the other of which is foot operated, to furnish more assurance that the operator always has immediate access to one of them. These valves are of the graduating type, that is, they control the pressure of air admitted to the cylinders so that the air in the cylinders may be at any pressure up to that of line 14. The delivery ports of the two control valves are connected to the two inlet ports of a double check valve 17. A line 18 is connected to the outlet port of this double check valve and has branches 18a and 18b, which are connected respectively to the inlet ports of double check valves 19 and 20. The delivery ports of these latter double check valves are connected to the inlet ports of cylinders 12 and 13 respectively.

When air is admitted to double check valve 17 from either of the control valves, the pressure closes the port of valve 17 to the other control valve and thus prevents escape of air via this other control valve. The other inlet ports of double check valves 19 and 20 are connected to the air lines of the emergency actuating means, as hereinafter explained. During normal operation of the system, these latter double check valves close against air escaping from branches 18a and 18b into the emergency means. The control valves and double check valves may be of any standard construction; hence they are not shown nor described in detail.

The system preferably includes the usual shut-off valves such as are indicated at 21 and pressure gauges such as are indicated at 22, which may be arranged as desired and likewise are not shown in detail.

In accordance with the present invention, separate emergency air reservoirs 23 and 24 are connected to the other inlet ports of the two double check valves 19 and 20 via emergency air lines 25 and 26. These lines contain relay valves 27 and 28 respectively, which furnished emergency control means and the preferred construction of which is described fully hereinafter. Preferably air is admitted to the emergency reservoirs from main supply line 14 via a line 29 which has branches 29a and 29b that extend to the two reservoirs. These branches contain check valves 30 and 30a, which permit air to enter the reservoirs but prevent its escape via this route. Thus the pressure of the emergency air supply in the two reservoirs is maintained at the normal pressure of the main source.

Relay valves 27 and 28 have control ports which are connected to main supply line 14 via a line 31, which has branches 31a and 31b that extend to these ports. Whenever the pressure in line 14 drops below the minimum needed for safe operation, both relay valves are actuated simultaneously. Actuation of relay valve 27 permits air to flow from reservoir 23 through emergency air line 25, double check valve 19, and thence to cylinder 12. Similarly actuation of relay valve 28 permits air to flow from reservoir 24 through emergency air line 26, double check valve 20, and thence to cylinder 13. In each instance the double check valves automatically seal emergency air lines 25 and 26 from branches 18a and 18b and permit air from each reservoir to go only to its own cylinder.

Preferably line 31 has a valve 32 to enable the emergency system to be operated manually when desired. Opening valve 32 permits air to escape from the system and has an effect similar to a failure in the system. Valve 32 can be of any standard construction which is capable in one position of connecting lines 31 and 14 and in another position of exhausting line 31 to the atmosphere and closing off line 14. Inasmuch as numerous valve constructions capable of functioning in this fashion are known, no detailed description is deemed necessary.

When a failure between the main source and double check valves 19 and 20 causes a sufficient loss of air pressure, the emergency system operates both brake cylinders and applies both brake bands. When a failure in one of the cylinders causes a sufficient loss of air pressure, the other cylinder is supplied with air from its own emergency reservoir independently of the cylinder which has failed. The mechanism is designed so that either braking device alone can stop the hoist reel.

When pressure in the main source is restored, valves 27 and 28 automatically close lines 25 and 26 against passage of air between the reservoirs and cylinders. As explained hereinafter, they also exhaust the cylinders to the atmosphere and thus permit the springs in the cylinders to release the brakes.

Figures 2 and 3 show in detail the preferred construction of valve 27, valve 28 being similar. Figure 2 shows the valve in the position in which it closes pipe 25 against flow of air from the reservoir and Figure 3 in the position in which it permits such flow.

Valve 27 comprises a body 33, which has a control port 34 connected to branch 31a, a supply port 35 connected to reservoir 23, an exhaust port 36 open to the atmosphere and a delivery port 37 connected to line 25 and thence to cylinder 12.

Body 33 contains a stem 38, a diaphragm 39 and a spring 40, which tends to move the stem to the Figure 3 position. Diaphragm 39 forms one wall of a pressure chamber within the body and the control port connects with this chamber. As long as the control pressure is sufficient to overcome the force of spring 40, the valve remains in the Figure 2 position. Stem 38 operates a valve disk 41, which seats in a tubular valve member 42. In Figure 2 this disk is seated and closes supply port 35 and thus prevents flow of air from reservoir 23. A spring 43 normally forces the lower end of valve member 42 against a seat 44, but in Figure 2, pressure on the diaphragm also holds valve member 42 unseated and delivery port 37 exhausts to the atmosphere via exhaust port 36. Thus there is no residual pressure from the emergency means on double check valve 19 and when pressure in the main source is restored after the emergency means has operated, the air in the cylinders escapes and allows the brakes to release. When the springs move the valve to the Figure 3 position on decreasing pressure on diaphragm 39, valve disk 41 unseats and valve member 42 seats. Thus communication is established between supply port 35 and delivery port 37 and air flows from the reservoir through the valve and into cylinder 12. In this position exhaust port 36 closes.

The operation of the system can be summarized as follows: Valve 15 or 16 normally controls application of both brakes. Opening either of these valves enables air to flow from line 14, through check valve 17, line 18, branches 18a and 18b, and check valves 19 and 20 to cylinders 12 and 13 and thus to apply both brakes. Valves 27 and 28 remain in the position shown in Figure 2. When there is a failure anywhere in the system and the air pressure in the main source drops sufficiently, valves 27 and 28 move to the position shown in Figure 3. Air flows from emergency tank 23 through valve 27, line 25, and check valve 19 to cylinder 12, and from emergency tank 24 through valve 28, and line 26 to cylinder 13, and thus applies both brakes. There is no direct connection between the two emergency tanks and their lines and valves, so that if there is a failure in one of them the other still can function.

Figure 4 illustrates a modified system in which the control valves are situated in a pilot line, rather than being subject to the full flow of air to the cylinders. The system is similar to that already described, except that its main supply line 14 contains a relay air valve 46 which is operated from a pilot line 47 connected to the main supply line. This relay valve may be of any standard construction and hence is not shown nor described in detail. Therefore the showing and description of valve 27 also suffices for valve 51. The pilot line preferably contains two control valves 48 and 49 in parallel and a double check valve 50, as in the system already described. This modified system has the advantage that the pilot line, which extends to the control station, and the control valves may be of much smaller size than are required where these parts receive the full flow of air to the cylinders.

Figure 5 illustrates a further modified system which has means for furnishing an audible warning that foretells failure of the air supply. This feature is illustrated on a system which has a pilot line for controlling the operation, as in Figure 4, but it is apparent that the same feature could be used in a direct system, as illustrated in Figure 1. The audible warning means comprises a relay operated valve 51, which may be of similar construction to valves 27 and 28. The supply port of valve 51 is connected to line 31 via a line 52 and the delivery port to a warning device 53, conveniently a whistle. The control port of valve 51 is connected to pilot line 47 via a line 54. this valve operates and admits air to the audible somewhat lower pressure than valves 27 and 28. When pressure in the system drops sufficiently, this valve operates and admits air to the audible warning device and thus warns the operator that pressure is decreasing and may enable him to correct the trouble before the emergency braking system operates.

From the foregoing description, it is seen that we have provided improved systems for emergency application of air brakes. The two braking devices have separate emergency systems and thus furnish a more fool-proof operation than is possible where the same emergency system operates both brakes.

While we have shown and described only certain preferred embodiments of the invention it is apparent that other modifications may arise. Therefore, we do not wish to be limited to the disclosure set forth but only by the scope of the appended claims.

We claim:

1. In an air brake mechanism which includes a pair of braking devices and a pair of cylinders operatively connected with said braking devices so that actuation of the cylinders actuates the braking devices, a system for normal and emergency actuation of said cylinders comprising a main source of compressed air, a pair of double check valves each having a pair of inlets and an outlet, the outlet of each of said double check valves being connected to the inlet of a different one of said cylinders, a line connected to said main source and having branches connected to one of the inlets of each of said double check valves, valve means controlling flow of air in said line and thereby controlling normal actuation of said cylinders, a pair of emergency sources of compressed air, lines connecting said emergency sources to the other inlets of said double check valves, and means releasing air from said emergency sources to said cylinders on loss of pressure in said main source, said double check valves preventing air from said emergency sources going elsewhere than to its own cylinder.

2. In an air brake mechanism which includes a pair of braking devices and a pair of cylinders operatively connected with said braking devices so that actuation of the cylinders actuates the braking devices, a system for normal and emergency actuation of said cylinders comprising a main source of compressed air, a pair of double check valves each having a pair of inlets and an outlet, the outlet of each of said double check valves being connected to the inlet of a different one of said cylinders, a line connected to said main source and having branches connected to one of the inlets of each of said double check valves, valve means controlling flow of air in said line and thereby controlling normal actuation of said cylinders, a pair of emergency sources of compressed air, lines connecting each of said emergency sources to the other inlets of said double check valves for actuating the cylinders independently of each other, relay valves in said last named lines closing these lines during normal operation of the system, and lines connecting said main source and said relay valves to permit flow of air from said emergency sources to said cylinders on loss of pressure in said main source.

3. In an air brake mechanism which includes a pair of braking devices and a pair of cylinders operatively connected with said braking devices so that actuation of the cylinders actuates the braking devices, a system for normal and emergency actuation of said cylinders comprising a main source of compressed air, a line connected to said source and having branches connected to said cylinders, a relay valve in said line, a pilot line connected to said first named line and to said relay valve, a manually operated graduating valve in said pilot line for operating said relay valve and controlling flow of air through said first named line and thereby controlling normal actuation of said cylinders, a pair of emergency sources of compressed air, lines connecting each of said emergency sources to a different one of said cylinders for actuating the cylinders independently of each other, and relay valves in said last named lines controlled by pressure in said main source for automatically admitting air from said emergency sources to said cylinders for actuating these cylinders on loss of pressure in said main source.

4. In an air brake, a pair of braking devices, a pair of cylinders which on actuation actuate said braking devices, manually controlled means for admitting air to said cylinders for normal actuation of said cylinders and said braking devices, a pair of emergency sources of compressed air each of which is connected to a different one of said cylinders, means for automatically admitting air from said emergency sources to said cylinders on failures in the system, and check valves between the emergency sources and the cylinders preventing air from each emergency source going elsewhere than to its own cylinder, the brake being operable from one cylinder regardless of failure in the other cylinder.

5. An air brake mechanism comprising a pair of braking devices, a pair of cylinders operatively connected with said braking devices so that actuation of the cylinders actuates the braking devices, a main source of compressed air, a line connected to said main source and having branches connected to said cylinders, valve means controlling flow of air in said line and thereby controlling normal actuation of said cylinders, a pair of emergency sources of compressed air, lines connecting said main source and said emergency sources for supplying the latter with compressed air, lines connecting each of said emergency sources to a different one of said cylinders, a relay valve in each of said last named lines, lines connecting said main source and said relay valves, pressure from said main source normally acting on said relay valves for preventing flow of air from said emergency sources, loss of pressure anywhere in said main source irrespective of the location of the leak automatically actuating said relay valves to permit such flow and thereby actuating said cylinders from said emergency sources, and check valve means preventing air from each of said emergency sources flowing to other than its own cylinder.

6. An air brake mechanism comprising a pair of braking devices, a pair of cylinders operatively connected with said braking devices so that actuation of the cylinders actuates the braking devices, a main source of compressed air, a line connected to said main source and having branches, a pair of double check valves each having an inlet connected to one of said branches and an outlet connected to one of said cylinders, valve means controlling flow of air in said line and thereby controlling normal actuation of said cylinders, a pair of emergency sources of compressed air, lines connecting said main source and said emergency sources for supplying the latter with compressed air, check valves in said last named lines preventing reverse flow of air from said emergency sources, lines connecting each of said emergency sources with an inlet of a different one of said double check valves, a relay valve in each of said last named lines, and lines connecting said main source and said relay valves, pressure from said main source normally acting on said relay valves for preventing flow of air from said emergency sources, loss of pressure anywhere in said main source irrespective of the location of the leak automatically actuating said relay valves to permit such flow and thereby actuating said cylinders from said emergency sources.

CHARLES J. KEIM.
AUGUST R. MAIER.
ALEXANDER QUAYLE.

REFERENCES CITED

The following references are of record in the file of this patent:

FOREIGN PATENTS

| Number | Country | Date |
|---|---|---|
| 203,071 | Great Britain | Sept. 6, 1923 |